United States Patent [19]

Vick

[11] 4,222,952

[45] Sep. 16, 1980

[54] SILOXANE BOND REARRANGEMENT EFFECTED BY SOLID PERFLUORINATED POLYMERS CONTAINING PENDANT SULFONIC ACID GROUPS

[75] Inventor: Steven C. Vick, Stormville, N.Y.

[73] Assignee: Union Carbide Corporation, New York, N.Y.

[21] Appl. No.: 51,492

[22] Filed: Jun. 25, 1979

[51] Int. Cl.$^2$ ............................ C08F 8/36; C08F 8/40; B01J 27/12

[52] U.S. Cl. .................................... 556/462; 252/426; 525/101; 525/104; 525/331

[58] Field of Search ............... 525/101, 104, 342, 331; 260/448.2 E; 252/426

[56] References Cited

U.S. PATENT DOCUMENTS

| | | | |
|---|---|---|---|
| 2,460,805 | 2/1949 | Britton et al. ......................... | 260/46.5 |
| 2,831,008 | 8/1958 | Knoft et al. ......................... | 260/448.2 |
| 3,322,722 | 5/1967 | Eynon ................................... | 260/46.5 |
| 3,375,223 | 3/1968 | Merrill ................................. | 260/46.5 |
| 3,398,177 | 8/1968 | Stewart ............................... | 260/448.2 |
| 3,694,405 | 9/1972 | Litteral .............................. | 260/46.5 R |
| 3,714,213 | 1/1973 | Miller et al. ...................... | 260/448.2 E |
| 3,816,493 | 6/1974 | Nitzche et al. .................... | 260/448.2 E |
| 3,853,933 | 12/1974 | Sicilliano ........................... | 260/448.2 E |
| 3,853,934 | 12/1974 | Sicilliano et al. ................. | 260/448.2 E |
| 4,038,213 | 7/1977 | McClure et al. .................... | 252/426 |

*Primary Examiner*—William F. Hamrock
*Attorney, Agent, or Firm*—Richard J. Gallagher

[57] ABSTRACT

Organosiloxane equilibrations and other bond rearrangements are easily and rapidly accomplished through the utilization of catalysts comprised of solid perfluorinated polymers containing pendant sulfonic acid groups.

18 Claims, No Drawings

SILOXANE BOND REARRANGEMENT EFFECTED BY SOLID PERFLUORINATED POLYMERS CONTAINING PENDANT SULFONIC ACID GROUPS

BACKGROUND OF THE INVENTION

1. Field of the Invention

This invention relates to the restructuring, by chemical bond rearrangement, of organosiloxane compositions comprising organosiloxane polymers. The object of such restructuring is to change the average molecular weight of the organosiloxane polymers, and, in the most preferred embodiment of the present invention, to provide equilibrated silicone oil compositions.

2. Description of the Prior Art

The desirability of and processes for achieving siloxane bond rearrangement have long been known. The process whereby Si-O linkages of a siloxane or mixture of siloxanes are continuously broken and re-formed until the system reaches an equilibrium condition at the thermodynamically most stable state is generally known as "equilibration". In practice, the term "equilibration" is also sometimes loosely applied to the rearrangement of low molecular weight siloxanes to higher polymers even when the process is not taken all the way to the equilibrium state. While heating alone will bring about this redistribution of siloxanes linkages, equilibrations are usually acid or base catalyzed. Among the catalysts which have been utilized are alkali metal bases such as the lithium, sodium, potassium, rubidium, or cesium oxides, hydroxides, alkoxides, or silanolates, quaternary bases such as the tetraalkylammonium or tetraalkylphosphonium hydroxides or alkoxides, and strong acids such as the Lewis acid HCl complexes, and hydrogen halides, sulfuric acid, boric acid, and trifluoromethylsulfonic acid. A review which gives some indication of the scope and complexity of the status of siloxane bond rearrangement as long ago as 1960 appears on pages 225-264 of the book "Organosilicon Compounds" by E. Eaborn, Academic Press, Inc., New York.

The utilization in siloxane equilibrations of catalysts such as those mentioned above suffers from a serious disadvantage. In order to obtain neutral high quality fluids, such catalysts require either extensive neutralizations and filtrations or thermal deactivation or destruction of the catalyst. It has previously been found that the use of supported catalysts avoids some of those catalyst post-treatment problems. Britton et al. U.S. Pat. No. 2,460,805 (February 8, 1949) was the first U.S. Patent to issue claiming the use of acid clays as catalysts for siloxane equilibrations. Knopf et al. U.S. Pat. No. 2,831,008 described siloxane equilibrations catalyzed by the use of fine-grained dilute acid-treated cation exchange media, such as carbon kaolin, montmorillonite/quartz, charcoal, bleaching earth, and gel-type synthetic resins. Eynon U.S. Pat. No. 3,322,722 taught that siloxane-alkoxy/acyloxy interchange in batch reactions was catalyzed by strong acids such as sulfuric acid and sulfonated macroreticular cation exchange resins. Merrill U.S. Pat. No. 3,375,223 showed that silanol condensation was catalyzed by a hydrogen chloride activated particulated siliceous material such as diatomaceous earth and fumed silica. Steward U.S. Pat. No. 3,398,177 showed redistribution of Si-H bonds catalyzed by acid clays. Litteral U.S. Pat. No. 3,694,405 described a continuous siloxane equilibration catalyzed by a macroreticular sulfuric acid cation exchange resin. Miller et al. U.S. Pat. No. 3,714,213 described how cyclopolysiloxanes containing methyl and silanic hydrogen substituents were prepared by catalytically cracking and cyclizing polysiloxanes containing Si-CH$_3$ and Si-H groups and high molecular weight chain terminal groups. The catalysts employed were acid-treated clays or synthetic alumina silicates. Nitzsche et al. U.S. Pat. No. 3,816,493 described the continuous preparation of organopolysiloxanes in an upflow design reactor using acid clays and sulfonated styrene-divinylbenzene copolymer. Sicilliano U.S. Pat. No. 3,853,933 taught that polysiloxane oils could be prepared continuously by siloxane-equilibration utilizing an acid-activated carbon black catalyst bed. Finally, Sicilliano et al. U.S. Pat. No. 3,853,934 showed that polysiloxane oils could be prepared continuously by siloxane equilibration utilizing an acid-activated clay column.

SUMMARY OF THE INVENTION

This invention is premised upon the discovery that siloxane bonds can be rearranged, and organopolysiloxanes can therefore be equilibrated, in processes which are unexpectedly quite efficient, through the utilization as equilibration catalysts of solid perfluorinated polymers containing pendant sulfonic acid groups.

DESCRIPTION OF THE PREFERRED EMBODIMENTS

A. The Siloxanes

The present invention constitutes an improvement in the vast field of siloxane bond rearrangement. As such, it is applicable to a wide variety of organopolysiloxane compositions. The most preferred embodiments of the present process invention relate to the production of stable silicone oils from the hydrolysis products of chlorosilanes by reactions with monofunctional silyl groups. The hydrolysis of substances such as dimethyldichlorosilane results in the formation of a complex mixture, the major component of which is the cyclic octamethylcyclotetrasiloxane. In order to prepare stable trimethylsilyl end-blocked polydimethylsiloxane silicone oils, such hydrolyzates are equilibrated with such end-blocker compounds as hexamethyldisiloxane or dodecamethylpentasiloxane. The average molecular weight, and therefore the viscosity, of the resulting trimethylsilyl end-blocked polydimethylsiloxane silicone oil is dependent upon the mole ratio of end-blocker compound to hydrolyzate.

The preferred organosiloxanes suitable for use in this process, alone or as mixtures, are:

1. Linear materials having the structure

wherein Me is methyl and k is 0, 1, 2, . . . , such as hexamethyldisiloxane, octamethyltrisiloxane, and in general all trimethylsiloxy end-blocked linear polydimethylsiloxanes and 2. Cyclic materials having the structure

wherein Me is methyl and 1 is 3, 4, . . . , such as hexamethylcyclotrisiloxane, octamethylcyclotetrasiloxane, and in general all cyclic polydimethylsiloxanes.

Other materials which may be used in the process of this invention include compounds as generically described below and mixtures thereof:

1. Linear materials having the structure $R_3Si(OSiR_2)_kOSiR_3$,

2. Cyclic materials having the structure $(R_2SiO)_l$, and
3. Silane esters having the structure $R_xSiR'_{4-x}$, wherein R is chosen from
(a) hydrogen,
(b) aliphatic hydrocarbon radicals such as methyl, ethyl, vinyl, etc.,
(c) substituted aliphatic hydrocarbon radicals such as 2-phenylethyl, 2-phenyl-n-propyl, etc.,
(d) aromatic hydrocarbon radicals such as phenyl, etc.,
(e) substituted aromatic hydrocarbon radicals such as tolyl, etc.,
(f) alkoxy radicals such as methoxy, ethoxy, isopropoxy, etc.,
(g) acyloxy radicals such as acetoxy, etc., and
(h) siloxy radicals such as trimethylsiloxy, dimethylsiloxy, etc., and R' is an alkoxy radical, and R and R' can represent the same or different substituents on the same molecule, and n is zero or a positive integer,
m is a positive integer of three or greater and
x is zero, one, two, or three.

Mixtures of cyclic and linear silicones linear silicones end-blocked by trimethylsiloxy, substituted-trimethylsiloxy, alkoxy, acyloxy, or hydroxy, such as for example in the hydrolysis products of dimethyldichlorosilane, may also be equilibrated according to the present invention.

In its broadest aspect, the present invention is applicable to siloxane bond rearrangement in general, and as to such, reference is taken to the literature and patents noted in the above Description of the Prior Art, all of which are as to the compositional limits of the present invention, incorporated by reference.

Amines can neutralize the solid perfluorinated resin containing pendant sulfonic acid groups, thereby rendering it inactive toward siloxane bond rearrangement. Accordingly, the organosiloxane compositions utilized in the process of this invention should be substantially free of amino groups.

Preferred organosiloxane compositions used as starting materials in the process of the present invention include those compositions which comprise mixtures of organosiloxanes, especially those compositions wherein the viscosity of said organosiloxane composition mixture is up to about 10,000 centipoises, and most especially those compositions wherein the mixture comprises hexamethyldisiloxane, e.g. in a minor amount, and a dimethylsiloxane, particularly octamethylcyclotetrasiloxane, e.g. in a major amount. Other preferred organosiloxane compositions according to the present invention include those wherein the mixture comprises: methyl hydrogen siloxane; a dimethylsiloxane; and a organosiloxane selected from the group consisting of hexamethyldisiloxane and sym-tetremethyldisiloxane.

B. The Catalyst

The catalyst systems which are used in practicing the process of the present invention comprise solid perfluorinated polymers containing pendant sulfonic acid groups.

Most preferred are those of the nominal formula

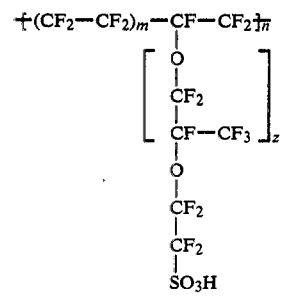

wherein $m = 5-13.5$, $n = $ ca. 1000, and $z = 1,2,3 \ldots$. Such catalysts, as well as other useful in the present invention, may be prepared by copolymerizing a compound of the structure $CF_2=CFOCF_2CF(CF_3)OCF_2CF_2SO_3H$, or more broadly, vinyl ethers of the structures $CF_2=CF[X]_uOCF_2CFRSO_3H$ and/or $CF_2=CF[X]_uOCF(SO_3H)CF_2R$, wherein X is $O(CF_2)_{2-10}$, $OCF_2CFY$, or $OCFYCF_2$, Y being F or $CF_3$, R is F or a perfluoroalkyl group having up to 10 carbon atoms, and u is 0,1, or 2, with perfluoroethylene and/or perfluoro-alpha-olefins. Such catalysts would normally have a molecular weight between from 1000 to 500,000.

The most preferred catalysts according to the present invention are disclosed in Gibbs et al. U.S. Pat. No. 3,041,317. (June 26, 1962), Connolly et al. U.S. Pat. No. 3,282,875, and Gibbs et al. U.S. Pat. No. 3,624,053. Some of these catalysts are commercially available under the trademark NAFION ®.

Other catalysts which may be used according to the present invention include polymers containing in the molecule a unit of the structures

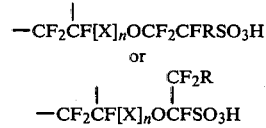

wherein X, R, and n are as defined above. Such polymer catalysts may be prepared by polymerizing the vinyl ethers described above, optionally in a perfluorocarbon solvent, using a perfluorinated free radical initiator such as perfluoroperoxide or a nitrogen fluoride. It is also possible to polymerize said vinyl ethers in aqueous medium using a peroxide or a redox initiator. Preparations of these catalysts are disclosed in Connolly et al. U.S. Pat. No. 3,282,875 and Cavanaugh et al. U.S. Pat. No. 3,882,093.

C. Reaction Techniques

Siloxanes bond rearrangement according to the present invention can be accomplished in many different ways. The most preferred processes are those wherein the product produced comprises a siloxane effluent in chemical bond equilibrium. All forms of the solid perfluoroalkyl resins containing pendant sulfonic acid groups may be used for single batch reactions, in continuously stirred tank reactions, and with fluidized catalyst beds. The most preferred processes are those wherein the organosiloxane composition is flowed continuously through a stationary catalyst bed, particularly a packed catalyst bed.

The process of the present invention comprises treating an organosiloxane composition with a solid perfluorinated polymer containing pendant sulfonic acid groups, preferably at a temperature of from about 70° C. to about 180° C., and most advantageously at a temperature of from about 120° C. to 150° C.

The use of a solid perfluoroalkyl polymer containing pendant sulfonic acids groups is especially advantageous in the treatment of high viscosity compositions. For example, the macroreticular sulfonated resin utilized for siloxane bond rearrangement in the abovementioned Litteral patent has been shown to be relatively unstable at temperature greater than about 125° C. As a result, the process is best run at temperatures under about 100° C. At these lower temperatures viscosities of the higher molecular weight polysiloxanes becomes a limiting factor. The greater the viscosity, the greater the back pressure on a continuous flow column. As a result, flow rates are slowed measurably. The catalysts of the instant invention are stable at higher temperatures; thus, the reaction mixtures can be heated to a more elevated temperature without decomposing the catalyst. At the same time, the viscosity is lower. It has been found that siloxane bond rearrangement processes can be run at temperatures round 150° C., well below the decomposition temperature of the new catalysts. The resulting lowered viscosity at this temperature allows for faster and more efficient flow rates of siloxane fluid through the packed bed and to a decrease in back pressure. As an additional benefit, in order to remove the lower molecular weight cyclic silicones formed during the reaction from the equilibrated fluid, which removal is usually accomplished at elevated temperatures under vacuum, the equilibrated fluids produced would not have to be preheated, but are simply fed directly into a stripper.

Siloxane bond rearrangements according to the present invention include the depolymerization of siloxane compositions, particularly those of high molecular weight. Often, especially when high molecular weight, or highly viscous siloxanes are being treated, they will be solvated for convenience.

Another method for utilizing the solid perfluorinated alkyl polymers containing pendant sulfonic acid groups according to this invention comprises utilizing it in such forms as beads, cubes, fibers, films, flakes, granules, membranes, screens, cut tubing (i.e. rings), or supported on a solid or porous substrate, or to pack a column.

For increased strength and rigidity, the solid perfluorinated polymers containing pendant sulfonic acid groups can be utilized according to the present invention on inert substrates, such as ceramics, metal screens, TEFLON ® fabrics, etc.

Such forms, or the larger forms of the solid perfluorinated polymers containing sulfonic acid groups mentioned above, make ideal packing material for a fixed bed. There would be no shifting of loose polymer in the packed bed, and as a result no plugging or channeling of the reaction column. Thus, flowing the organosiloxane composition to be rearranged through such a packed catalyst bed is currently the most preferred aspect of the present invention.

Of particular advantage in this application would be the use of the catalyst in tubing form. By passing a stream of low molecular weight cyclic and linear silicones through a long ⅛" diameter tube of solid perfluorinated alkyl polymer containing pendant sulfonic acid groups at temperatures of about 70°–150° C. one obtains equilibrated siloxanes fluids in very short residence times (on the order of 4.5 minutes). Significant reductions in back pressures over conventional packed fixed bed columns would be obtained, resulting in simpler reactor design. More broadly, these advantages may be realized by flowing the siloxane composition through and/or around one or more tubes or fibers comprising a solid perfluorinated polymer containing sulfonic acid groups.

The most preferred process according to this invention involves the utilization of a reactor comprising a plurality of tubes composed of or coated by the solid perfluorinated alkyl polymer containing pendant sulfonic acid groups. Utilizing such a reactor, siloxane fluids to be equilibrated would flow through and around the tubes, resulting in suprisingly rapid and facile equilibrations.

D. Experimental

The present invention is illustrated by the following experimental Examples. However, these illustrative Examples should not be construed as limiting the scope of the invention.

All starting material silanes and siloxanes were of high purity and were distilled before use. All reactions, except where indicated, were carried out in standard laboratory glassware under a blanket of nitrogen.

Abbreviations which appear in the experimental Examples are defined as follows:

| glc (or Glc) | gas liquid chromatography |
| D | —(CH$_3$)$_2$SiO— |
| M | (CH$_3$)$_3$SiO$_{\frac{1}{2}}$— |
| Silicone Oil | trimethylsilyl endblocked polydimethylsiloxane |
| GPC | gel permeation chromatography |
| Catalyst | a compound having an equivalent weight of about 1100 and having the approxmate formula —[(CF$_2$CF$_2$)$_{6.5}$—CFCF]$_{1000}$ with pendant —O—CF$_2$—CF$_2$—O—CF$_2$—CF$_2$—SO$_3$H |

Glc analyses were carried out with a Hewlett Packard 5830A gas chromatograph instrument. The column was 10'×⅛"–10% UC-W98 on Chromosorb 750, temperature programed for:
75° C. for 2 min.
75° C.–350° C. at 15° C./min.
350 for 45 min.

EXAMPLE 1

Silicone Oil Equilbration

A 200 ml round bottomed flask, equipped with reflux condenser, nitrogen inlet, overhead stirring apparatus, thermowatch, and thermometer, was charged with 100 g of octamethylcyclotetrasiloxane (D$_4$) and 1.0 g of Catalyst granules. The mixture was heated to 150° C. At ca. 130° C., the Catalyst changed to a red-brown color and visible thickening of the D$_4$ was observed. The mixture was allowed to cool to 90° C., whereupon 4.66 g of hexamethyldisiloxane (MM) was added. The mixture was again heated to 150° C. The viscosity was dramatically lowered within 1–2 minutes. After 15 minutes, the suspension was filtered through a coarse glass frit to yield a clear colorless filtrate product (Silicone Oil equilibrate). The use Catalyst was washed with diethyl ether and dried. This reaction or equilibration procedure was repeated an additional 15 times, with the same Catalyst, which was either washed and dried after each batch, and utilizing similar quantities of D$_4$ and MM. The only change was that the MM was added to the partially polymerized D$_4$/Catalyst mixture at 150° C. Viscosity lowered was again immediate. Therefore, approximately 1700 g of D$_4$/MM mixture was equilibrated by 1.0 g of Catalyst with no apparent loss of catalytic activity or rate of reaction. If a temperature greater than 150° C. was reached, there was some slight coloration of the equilibrate which was not evident at temperatures of 150° C. or lower.

EXAMPLE 2

Formation of MD$_{15}$M from Both Lower and High Molecular Weight Dimethylsiloxanes A 2.0 g sample of Catalyst granules was tested for catalytic activity in a equilibration of MM and D$_4$, as described above (Example 1). The active catalyst was filtered, washed with diethylether, dried, and stored for further examination.

A 200 ml round bottomed flask (Flask 1), equipped with overhead stirring apparatus, nitrogen inlet, reflux condenser, and thermowatch was charged with 100.0 g of D$_4$ and 0.80 g of the above Catalyst granules. This mixture was heated to 150° C. with stirring. After approximately 45 minutes, a high molecular weight gum had formed in the flask. The flask was cooled to room temperature in a cold water bath, whereupon 16.0 g of MM was added. A similarly equipped flask (Flask 2), was charged to 100.0 g of D$_4$, 16.0 g of MM, and 0.80 g of the Catalyst granules.

Both flasks then were heated to 150° C. at the same rate. The contents of Flask 1 became visibly less viscous, while that of Flask 2 became more viscous. After 45 minutes, at 150° C., both flasks were allowed to cool to room temperature and were stored overnight. Aliquots then were withdrawn for glc analysis. The flasks were heated to 150° C. for an additional 90 minutes and a second set of aliquots were withdrawn. Additional heating to 150° C. for 180 minutes gave a third set of aliquots. Glc analysis of the aliquots revealed that the contents of Flask 2 had approached equilibrium during 45–135 minutes at 150° C. The contents of Flask 1, however, required approximately 5 hours to reach equilibrium. The final glc traces from Flask 1 and 2 were identical, indicating that a true equilibrium mixture had been achieved in both cases.

EXAMPLE 3

Equilibration of MD$_{15}$M: Rate Study

A standard flask was charged with 108.6 g of D$_4$ and 16.09 g of MM (calculated to give MD$_{15}$M). The solution was heated to 90° C., and 0.93 g of Catalyst granules were added. The mixture ws rapidly heated to and maintained at 150° C. Aliquots were withdrawn periodically for glc analysis up to a total elapsed time of 150 min. Glc analysis give the following data:

| ALIQUOT | MINUTES AFTER CATALYZATION | TEMP 20°C. | AREA % BY GLC D$_4$ | D$_5$ | OTHERS |
|---|---|---|---|---|---|
| 1 | 5 | 120 | 84 | 0 | 16.0 |
| 2 | 10 | 143 | 77 | 0.8 | 22.2 |
| 3 | 15 | 150 | 48 | 5.9 | 46.0 |
| 4 | 25 | 150 | 30 | 9.7 | 60.4 |
| 5 | 35 | 150 | 22 | 10.7 | 67.3 |
| 6 | 50 | 150 | 18 | 10.6 | 71.3 |
| 7 | 65 | 150 | 16.9 | 10.6 | 72.5 |
| 8 | 80 | 150 | 16.3 | 10.5 | 73.2 |
| 9 | 100 | 150 | 15.6 | 10.4 | 74.0 |
| 10 | 120 | 150 | 15.2 | 10.2 | 74.6 |
| 11 | 150 | 150 | 15.0 | 10.1 | 74.9 |

The initial rate of reaction was rapid but slowed drmatically within 35 minutes as the equilibrium point was approached. Only relatively slight changes in glc characteristic were observed after 1 hr at 150° C., suggesting that the equilibrium point was closely approached within 1 hr.

EXAMPLE 4

Stability of L-45 Fluid

The MD$_{15}$M fluid from the rate study Example 3 was briefly studied for stability. A flask was charged with 50.0 g of the filtered MD$_{15}$M fluid from Example 3 and 22.0 g of D$_4$. After initial mixing, an aliquot was withdrawn for glc analysis. The remaining solution was heated to 150° C. for 5 hours. Glc analysis of this mixture was identical with that of the starting mixture. Therefore, as no further equilibration took place, the product was judged to be stable. This indicates that no acid was leached from the Catalyst granules. Had some acid (even small amounts) been removed from the Catalyst, the fluid would have been re-equilibrated upon addition to more D$_4$ and application of heat. Therefore, the product fluids appear to be completely neutral.

EXAMPLE 5

Continuous Process for Silicone Oil Production

A U-shaped 12"×¼" stainless steel column (approximate volume 5.6 cc) was washed with acetone, toluene, and hexane and then dried. After loosely plugging one end with glass wool, the column was packed with ca. 5.5 g of fresh Catalyst granules (not previously reacted with siloxane reactants). The other end was then loosely plugged with glass wool. The ends of the column were then attached to 1/16" tubing via swagelock fittings. A glc oven was used as a heater, with the 12"×¼" column inside the oven and the 1/6" tubing entering and exiting through the injection ports of the glc instrument. The injection ports were heated to 100° C. to function as a short pre-heater for the liquid flow. A metering pump was attached to one of the lengths of 1/16" tubing. The pump was set to deliver 190 ml/hr or 3.17 ml/min at maximum capacity. A receiver was used to collect the material passed through the column.

A stock solution of MM and $D_4$ (calculated to produce an $MM/D_4$ weight ratio of 14.6/100) was placed in the reservoir and it was pumped through the column at the maximum rate of 190 ml/hr. The temperature was set initially at 70° C. and raised in 10° C. intervals to a maximum of 150° C. A sample for later glc analysis was taken after 10 minutes at any one specific temperature. As 31 ml of $MM/D_4$ mixture would pass through the column during 10 minutes (5.6 times the empty column volume), it was felt that a 10 minute waiting period would give truly representative samples of the material flowing through the column. The collected samples were analyzed by glc, and gave the following results:

| Temperature (°C.) | Area % By Glc | | | |
|---|---|---|---|---|
| | MM | $D_4$ | $D_5$ | Others |
| 70 | 15.3 | 84.0 | — | 0.7 |
| 80 | 14.6 | 83.6 | — | 1.8 |
| 90 | 12.8 | 82.0 | — | 5.2 |
| 100 | 8.8 | 78.9 | — | 12.3 |
| 110 | 0.9 | 55.5 | 3.9 | 39.7 |
| 120 | 1.1 | 23.6 | 9.8 | 65.5 |
| 130 | 1.8 | 16.6 | 10.7 | 70.9 |
| 140 | 2.3 | 16.6 | 10.8 | 70.3 |
| 150 | 2.3 | 18.6 | 11.6 | 67.5 |

Some minor amount of equilibration is noted at 70° C., while virtually complete equilibration is observed by 130° C. at these flow rates.

A second run with this column was terminated at 100° C.; it was noted that the Catalyst granules had swelled, and the Catalyst had pushed itself out of both ends of the column thus plugging it. Therefore, use of the Catalyst pretreated with $MM/D_4$ at 150° C. was suggested as the recommended procedure to follow.

A similar column was prepared utilizing Catalyst granules which was previously used in $MM/D_4$ equilibrations. The reaction was run identical manner to the above. Samples were collected every 10° C. with a 10 minute waiting period before sample collection. Under these conditions, where as the previously unreacted Catalyst had given evidence of swelling, the reacted Catalyst gave no indication of expanding. Results from this run are displayed below:

| Temperature (°C.) | Area % by Glc | | | |
|---|---|---|---|---|
| | MM | $D_4$ | $D_5$ | Others |
| 70 | 14.2 | 82.7 | — | 3.1 |
| 80 | 12.5 | 81.3 | — | 6.2 |
| 90 | 9.6 | 78.5 | — | 11.9 |
| 100 | 4.4 | 72.8 | — | 22.8 |
| 110 | 0.8 | 37.4 | 7.9 | 53.9 |
| 120 | 1.3 | 23.5 | 11.2 | 64.0 |
| 130 | 1.8 | 19.2 | 11.9 | 67.1 |
| 140 | 2.4 | 19.4 | 12.5 | 65.7 |
| 150 | 2.6 | 20.4 | 12.8 | 64.2 |
| 150 | 2.5 | 20.9 | 13.0 | 63.6 |
| 150 | 2.3 | 20.0 | 12.5 | 65.2 |
| 150 | 2.1 | 20.2 | 12.6 | 65.1 |

Data from both experiments are in generally close agreement indicating that the catalysts exhibit approximately the same activity regardless of pretreatment as described above. The empty column residence time for these experiments was calculated to be 1.7 minutes. Assuming a conservative estimate that the Catalyst granules occupy greater than 50% of the volume of the column, the actual residence time would be less than 1 minute, a decidedly short residence time.

Silicon Oil Equilibration: Catalyst in Tubing Form

Two meters of Catalyst in the form of $\frac{1}{8}''$ tubing were wound into a four to five inch coil. The ends were connected using swagelock adapters, to $\frac{1}{8}''$ stainless steel tubing with the coil mounted inside the over chamber of a glc used as a heater. The first piece of S/S tubing ran out through the second injection port to the outlet reservoir. An $MM/D_4$ siloxane mixture (to give $MD_{15}M$) was pumped at a rate of ca. 190 ml/hr through the coil with oven temperature at 140° C. This flow rate was maintained for 25 minutes giving a residence time of 4.5 minutes. Aliquots were removed for glc analysis which revealed that the amount of $D_4$ initially present had been reduced from 80% to 18% within 4.5 minutes. Complete equilibration was not indicated, but this data suggests that by proper control of reaction conditions full equilibrations is possible. Low back pressure in this type of process vs packed beds is attractive and would be more so if it were necessary to use higher viscosity fluids as starting materials.

EXAMPLE 7

Preparation of a Si-H Modified Silicone Fluid $D'$ is defined as $-HSi(CH_3) O-$ A standard flask was charged with 87.44 g of $D_3D'$ and 12.56 g of MM (to give $MD_{12}D_4'M$). After complete mixing, an aliquot was withdrawn for initial SiH analysis. To the remainder there was added 0.90 g of Catalyst granules, and the mixture was heated to 150° C. Aliquots were withdrawn periodically for glc analysis, which revealed slower equilibration than in straight dimethylsiloxane cases and a broad peak with a long retention time not observed in straight dimethylsiloxane equilibrations. A sample was withdrawn after 4 hours for a final Si-H analysis.

SiH calculated: 69.5 cc $H_2$/g
Si-H initial (anal.): 65.1 cc $H_2$/g
Si-H final (anal.): 60.8 cc $H_2$/g.

Therefore, loss of Si-H corresponds to 4.3 cc/g (6.6% of total Si-H). There was at no time any evidence of gas ($Me_2SiH_2$) evolution.

EXAMPLE 8

Equilibration of $MeSi(OEt)_3$ and $D_4$

A sample of Catalyst granules was checked for catalytic activity prior to use. With 1.0 g of Catalyst granules present, 100 g of $D_4$ was polymerized (i.e. equilibrated) rapidly to a viscous liquid within 15 minutes at 150° C. Addition of 5.0 g of MM resulted in almost immediate thinning of this liquid. The Catalyst was filtered, washed with diethyl ether, and dried before use.

The standard apparatus was flamed dry and flushed with nitrogen. The cooled flask was charged with 100 g of $D_4$, 16.58 g of $MeSi(OEt)_3$ and the recovered Catalyst from the above paragraph. The contents of the flask were then heated as rapidly as possible to, and maintained at, 150° C. Aliquots were withdrawn periodically for glc analysis. It was noted that the $MeSi(OEt)_3$ disappeared very rapidly (within 15 minutes) from the reaction mixture, but that the $D_4$ was not equilibrated with the fluid at as rapid a rate. After 2 hrs $D_4$ accounted for 53% of the fluid by glc area %; after 5 hrs, the amount of $D_4$ was significantly reduced; after 8 hours it was concluded that the mixture had reached or was nearing equilibrium. Stirring was discontinued, the Catalyst was allowed to settle to the bottom of the flask, and the equilibrate was withdrawn carefully via syringe. The Catalyst was washed with three 20 ml aliquots of $D_4$ (specially dried over 5A molecular sieves). The flask then was charged with 100 g of $D_4$ (dried over sieves) and 14.8 g of MM, also dried over sieves. This mixture was heated rapidly to 150° C., with aliquots withdrawn periodically for glc analysis. Examination of the glc traces revealed the following.

| Aliquot | Time (min) | Temp °C. | Glc Area % | | |
|---|---|---|---|---|---|
| | | | $D_4$ | $D_5$ | Others |
| 1 | 10 | 140 | 61.5 | 2.4 | 36.1 |
| 2 | 20 | 146 | 44.5 | 6.0 | 49.5 |
| 3 | 30 | 150 | 33.0 | 8.1 | 58.9 |
| 4 | 45 | 150 | 22.2 | 9.7 | 68.1 |
| 5 | 60 | 150 | 16.6 | 9.8 | 73.6 |
| 6 | 80 | 150 | 13.7 | 9.1 | 77.2 |
| 7 | 95 | 150 | 12.9 | 8.6 | 78.5 |
| 8 | 120 | 150 | 12.4 | 8.2 | 79.4 |
| 9 | 270 | 150 | 13.4 | 8.2 | 78.4 |

Analysis of these data revealed that this reaction is only slightly slower than that of Example 3. This could be due to slightly different catalyst loadings. It appears that the catalytic activities of the Catalyst are not lost in a $D_4$/MeSi(OEt) equilibration.

Comparison of the final glc trace in the $D_4$/MeSi(OEt)$_3$ system above with a KOH catalyzed equilibrate revealed similar but not completely identical traces. Thus, one may assume the system to be at or near equilibrium.

EXAMPLE 9

Straight Dimethylsiloxane

A 250 ml round bottom flask equipped with mechanical stirrer was charged with 100.0 grams of $D_4$ cyclic tetramer and 3.4 grams of $MD_3M$ to give $MD_{150}M$ followed by the addition of 1.16 grams of Catalyst granules. The mixture was quickly heated with continuous stirring and maintained at 140° C. for approximately 1¼ hr. An increase in viscosity was apparent approximately fifteen minutes after 140° was reached. The resulting fluid was filtered hot, and samples taken for GPC and viscosity analyses. GPC analysis showed a major peak corresponding to an average m.w. of 8,400. Viscosity of the final equilibrate was found to be 147 centistokes.

EXAMPLE 10

Straight Dimethylsiloxane

A 250 ml round bottom flask equipped with mechanical stirrer was charged with 146.2 grams of $D_3$, 3.85 grams $MD_3M$ (to give $MD_{200}M$) and 1.0 gram of Catalyst granules. The mixture was quickly heated with continuous stirring and maintained at 145° C. for three hours and fifteen minutes. The resulting fluid was filtered hot, and samples taken for GPC and viscosity analyses. GPC analysis showed a major peak corresponding to 13,000–14,000 average m.w. Viscosity was found to be 305 centistokes.

EXAMPLES 11–15

In the Examples which follow, high purity hexamethyldisiloxane (MM) and decamethylcyclopentasiloxane ($D_5$) were equilibrated. A standard one liter round bottom flask was equipped with a Claisen adapter, a reflux condenser, an argon inlet, a pot thermometer, a thermowatch, an overhead mechanical stirring apparatus, and a rubber septum (for aliquot removal). The flask was charged with 600 grams of an MM:$D_5$ siloxane mixture in a weight ratio of 1:74. The mixture was catalyzed with 7.5 grams of various types and forms of catalyst, indicated below, and heated with continuous stirring to 120° C. Aliquots (of 15–20 grams) were withdrawn periodically through the rubber septum via a pipette, vialed, and cooled with an ice bath. In the cases where the catalyst forms were flakes or powders, some of the catalyst was removed with each aliquot, and it was necessary to filter these aliquots before viscosity analyses were performed. In the reactions using catalyst in the forms of cubes or rings (i.e. cut tubing), the catalyst quickly settled to the bottom of the flask prior to aliquot removal. Viscosity data and weight percent of cyclics ($D_4$ and $D_5$) for the equilibrations utilizing various types and forms of catalyst are presented below. The catalysts utilized were characterized by the approximate formula

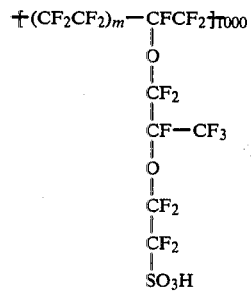

wherein m is as indicated in each Example.

EXAMPLE 11

The catalyst, m=7.5, was in the form of a powder. Since catalyst was removed with each aliquot, there was no change in catalyst concentration throughout the equilibration.

| Sample | Time (min) | Viscosity (cSt) | $D_4$ | $D_5$ | $D_6$ | $D_7$ | grams removed |
|---|---|---|---|---|---|---|---|
| 1 | — | — | — | — | — | — | 19.20 |
| 2 | 17 | 270 | 5.29 | 3.75 | 1.22 | 0.32 | 19.17 |
| 3 | 25 | 273 | 4.96 | 3.50 | 1.13 | 0.28 | 18.58 |
| 4 | 40 | 285 | 4.55 | 3.21 | 1.06 | 0.26 | 19.20 |
| 5 | 55 | 290 | 5.40 | 3.72 | 1.27 | 0.41 | 19.23 |
| 6 | 85 | 297 | 5.46 | 3.80 | 1.28 | 0.34 | 20.13 |
| 7 | 125 | 309 | 6.29 | 4.44 | 1.43 | 0.35 | 18.92 |
| 8 | 150 | 303 | 5.41 | 3.75 | 1.30 | 0.37 | 20.45 |
| 9 | 230 | 316 | 4.45 | 3.10 | 1.20 | 0.32 | 20.67 |
| 10 | 280 | 326 | 5.48 | 3.82 | 1.25 | 0.40 | 21.11 |

EXAMPLE 12

The catalyst, m=7.0, was in the form of 4 mil flakes. Since catalyst was removed with each aliquot, there was no change in catalyst concentration throughout the equilibration.

| Sample | Time (min) | Visc. (cSt) | $D_4$ | $D_5$ | $D_6$ | $D_7$ | grams removed |
|---|---|---|---|---|---|---|---|
| 1 | 3 | 10.1 | 537 | 56.79 | 1.32 | 0.18 | 17.49 |
| 2 | 5 | 16.7 | 7.66 | 49.49 | 1.98 | 0.41 | 16.24 |
| 3 | 8 | 49.8 | 7.03 | 22.45 | 1.79 | 0.52 | 16.82 |

-continued

| Sample | Time (min) | Visc. (cSt) | $D_4$ | $D_5$ | $D_6$ | $D_7$ | grams removed |
|---|---|---|---|---|---|---|---|
| 4 | 12 | 183 | 5.86 | 9.49 | 1.48 | 0.27 | 16.40 |
| 5 | 20 | 225 | 5.61 | 4.87 | 1.25 | 0.28 | 15.94 |
| 6 | 32 | 226 | 5.38 | 4.48 | 1.26 | 0.39 | 16.00 |
| 7 | 45 | 291 | 4.99 | 3.46 | 1.16 | 0.20 | 15.84 |
| 8 | 60 | 297 | 5.03 | 3.55 | 1.10 | 0.27 | 16.26 |
| 9 | 90 | 286 | 4.54 | 3.05 | 1.08 | 0.29 | 16.08 |
| 10 | 120 | 294 | 5.36 | 3.82 | 1.21 | 0.41 | 15.54 |
| 11 | 180 | 287 | 4.58 | 3.17 | 1.07 | 0.27 | 16.05 |

EXAMPLE 13

The catalyst, m=7.5, was in the form of cubes (3 mm by 3½ mm). Since catalyst was not removed during the reaction, the relative concentration of catalyst increased with the removal of each aliquot.

| Sample | Time (min) | Visc. (cSt) | $D_4$ | $D_5$ | $D_6$ | $D_7$ | grams removed |
|---|---|---|---|---|---|---|---|
| 1 | 8 | 4.26 | 2.56 | 93.81 | 0.71 | ND | 15.30 |
| 2 | 20 | 5.26 | 3.87 | 88.86 | 1.01 | ND | 15.68 |
| 3 | 30 | 6.46 | 5.32 | 80.95 | 1.34 | ND | 14.30 |
| 4 | 45 | 9.28 | 6.47 | 76.70 | 1.78 | 0.22 | 16.94 |
| 5 | 60 | 14.3 | 7.90 | 65.14 | 2.26 | 0.51 | 15.57 |
| 6 | 90 | 30.2 | 9.13 | 48.45 | 2.78 | 0.74 | 16.60 |
| 7 | 150 | 145 | 9.00 | 16.60 | 2.51 | 0.47 | 15.55 |
| 8 | 210 | 250 | 6.73 | 6.45 | 1.72 | 0.41 | 14.96 |
| 9 | 270 | 265 | 6.40 | 5.03 | 1.51 | 0.34 | 15.00 |

EXAMPLE 14

The catalyst, m=6.5, was in the form of ⅛-inch tubing. Since catalyst was not removed during the reaction, the relative concentration of catalyst increased with the removal of each aliquot.

| Sample | Time (min) | Visc. (cSt) | $D_4$ | $D_5$ | $D_6$ | $D_7$ | grams removed |
|---|---|---|---|---|---|---|---|
| 1 | 3 | 3.88 | 1.55 | 91.8 | 0.40 | 0.04 | 19.64 |
| 2 | — | — | — | — | — | — | — |
| 3 | 8 | 4.38 | 3.71 | 80.39 | 0.62 | 0.08 | 12.83 |
| 4 | 12 | 6.06 | 3.40 | 62.7 | 0.81 | 0.13 | 16.80 |
| 5 | 20 | 12.3 | 6.60 | 63.5 | 1.50 | 0.06 | 16.78 |
| 6 | 30 | 22.4 | 5.48 | 58.2 | 1.38 | 0.42 | 16.95 |
| 7 | 45 | 43.6 | 6.87 | 36.6 | 2.12 | 0.55 | 16.57 |
| 8 | 60 | 76.8 | 7.81 | 25.52 | 2.13 | 0.58 | 16.60 |
| 9 | 75 | 108 | 8.24 | 20.59 | 2.21 | 0.76 | 16.27 |
| 10 | 105 | 170 | 6.74 | 10.18 | 1.77 | 0.56 | 16.66 |
| 11 | 165 | 211 | 6.15 | 5.99 | 1.62 | 0.51 | 16.20 |
| 12 | 225 | 233 | 5.46 | 4.41 | 1.36 | 0.42 | 16.17 |

EXAMPLE 15

The catalyst, m=6.5, was in the form of ⅛-inch tubing. Since catalyst was not removed during the reaction, the relative concentration of catalyst increased with the removal of each aliquot. In this example, the stirring efficiency was increased relative to that in Examples 11–14 through the use of a Morton Flask and an increased rate of stirring.

| Sample | Time (min) | Visc. (cSt) | $D_4$ | $D_5$ | $D_6$ | $D_7$ | grams removed |
|---|---|---|---|---|---|---|---|
| 1 | 3 | 4.75 | 3.44 | 96.20 | 0.82 | ND | 17.40 |
| 2 | 5 | 5.60 | 3.65 | 88.10 | 0.92 | ND | 17.06 |
| 3 | 8 | 7.15 | 4.70 | 85.27 | 1.21 | 0.22 | 17.15 |
| 4 | 12 | 10.0 | 5.63 | 78.45 | 1.47 | 0.30 | 17.57 |
| 5 | 20 | 22.2 | 8.34 | 59.74 | 2.05 | 0.48 | 16.90 |
| 6 | 30 | 45.6 | 9.22 | 45.27 | 2.47 | 0.69 | 16.44 |
| 7 | 45 | 115 | 8.54 | 19.65 | 2.32 | 0.68 | 16.01 |
| 8 | 60 | 191 | 7.88 | 9.29 | 2.09 | 0.57 | 15.38 |
| 9 | 90 | 244 | 6.76 | 5.16 | 1.66 | 0.44 | 15.91 |
| 10 | 150 | 257 | 6.22 | 4.49 | 1.48 | 0.33 | 16.33 |
| 11 | 270 | 256 | 6.18 | 4.46 | 1.42 | 0.48 | 16.55 |
| 12 | 330 | 268 | 6.45 | 4.55 | 1.50 | 0.48 | 15.91 |
| 13 | 390 | 267 | 6.33 | 4.41 | 1.48 | 0.38 | 16.20 |

What is claimed is:

1. A process for siloxane bond rearrangement which comprises treating, at a temperature of from about 70° C. to about 180° C., an organosiloxane composition with a solid perfluorinated polymer containing pendant sulfonic acid groups.

2. A process as in claim 1 which comprises treating, at a temperature of from about 120° C. to about 150° C., an organosiloxane composition with a solid perfluorinated polymer containing pendant sulfonic acid groups.

3. A process as in claim 1 wherein said organosiloxane composition is a mixture of organosiloxanes.

4. A process as in claim 3 wherein the viscosity at 25° C. of said organosiloxane composition mixture is up to about 10,000 centipoises.

5. A process as in claim 4 wherein the mixture comprises hexamethyldisiloxane and polydimethylsiloxane.

6. A process as in claim 5 wherein said mixture comprises a minor amount of hexamethyldisiloxane and a major amount of octamethylcyclotetrasiloxane.

7. A process as in claim 4 wherein the mixture comprises:
methyl hydrogen siloxane; polydimethylsiloxane; and an organosiloxane selected from the group consisting of hexamethyldisiloxane and sym-tetramethyldisiloxane.

8. A process as in claim 1 wherein said siloxane bond rearrangement comprises depolymerization.

9. A process as in claim 1 wherein said organopolysiloxane composition is solvated.

10. A process as in claim 1 wherein the solid perfluorinated polymer containing pendant sulfonic acid groups is present in the form of a bead, a cube, a fiber, a flake, a granule, a membrane, a powder, a ring, a screen, or a tube, or is supported on an inert substrate.

11. A process as in claim 10 wherein the siloxane composition is flowed through and/or around one or more tubes comprising a solid perfluorinated polymer containing sulfonic acid groups.

12. A process as in claim 1 wherein the siloxane bond rearrangement is carried out batchwise.

13. A process as in claim 1 wherein the siloxane bond rearrangement is carried out in a continuously stirred tank reactor.

14. A process as in claim 1 wherein said organosiloxane composition is flowed through a fluidized catalyst bed.

15. A process as in claim 1 wherein said organosiloxane composition is flowed continuously through a stationary catalyst bed.

16. A process as in claim 15 wherein said organosiloxane composition is flowed continuously through a packed catalyst bed.

17. A process as in claim 1 wherein the product comprises a siloxane effluent in chemical bond equilibrium.

18. A process as in ay one of claims 1, 2, 3, 4, 5, 6, 7, 8, 9, 10, 11, 12, 13, 14, 15, 16, or 17 in which said solid perfluorinated polymer containing pendant sulfonic acid groups is characterized by the formula
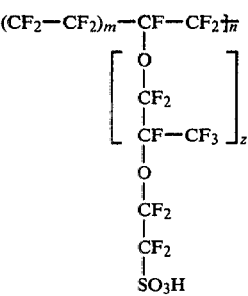
wherein m is from 5 to 13.5, n is about 1000, and z is from 1 to about 3.
* * * * *

UNITED STATES PATENT AND TRADEMARK OFFICE
CERTIFICATE OF CORRECTION

PATENT NO. : 4222952
DATED : September 16, 1980
INVENTOR(S) : S.C. Vick

It is certified that error appears in the above—identified patent and that said Letters Patent is hereby corrected as shown below:

Column 1, line 40, for "E" read --C--.
Column 1, line 69, for "sulfuric" read --sulfonic--.
Column 3, line 32, for "n" read --k--.
Column 3, line 33, for "m" read --1--.
Column 7, line 21, for "either" read --ether--.
Column 7, line 39, for "diethylether" read --diethyl ether--.
Column 8, line 48, for "to" read --of--.
Column 10, line 3 1/2, for "Silicon" read --Silicone--.
Column 10, line 8, for "over" read --oven--.

Signed and Sealed this

Tenth Day of February 1981

[SEAL]

Attest:

RENE D. TEGTMEYER

Attesting Officer

Acting Commissioner of Patents and Trademarks